(12) United States Patent
Czarnian et al.

(10) Patent No.: US 12,145,619 B2
(45) Date of Patent: Nov. 19, 2024

(54) SELF-LOCALIZATION OF A VEHICLE IN A PARKING INFRASTRUCTURE WITH SELECTIVE SENSOR ACTIVATION

(71) Applicants: Cariad SE, Wolfsburg (DE); Volkswagen Aktiengesellschaft, Wolfsburg (DE)

(72) Inventors: Sven-Garrit Czarnian, Berlin (DE); Thomas Dammeier, Berlin (DE); Michael Holicki, Berlin (DE); Ralph Hänsel, Berlin (DE); Timo Iken, Wolfsburg (DE); Roland Kube, Schwülper (DE); Carolin Last, Braunschweig (DE); Stefan Wappler, Berlin (DE)

(73) Assignee: CARIAD SE, Wolfsburg (DE)

( * ) Notice: Subject to any disclaimer, the term of this patent is extended or adjusted under 35 U.S.C. 154(b) by 308 days.

(21) Appl. No.: 17/860,936

(22) Filed: Jul. 8, 2022

(65) Prior Publication Data

US 2023/0011156 A1 Jan. 12, 2023

(30) Foreign Application Priority Data

Jul. 9, 2021 (DE) .......................... 102021117742.1

(51) Int. Cl.
*B60W 60/00* (2020.01)
*B60W 40/105* (2012.01)
(Continued)

(52) U.S. Cl.
CPC ...... *B60W 60/0011* (2020.02); *B60W 40/105* (2013.01); *G01S 13/931* (2013.01);
(Continued)

(58) Field of Classification Search
CPC ............ B60W 60/0011; B60W 40/105; G06V 20/58; G06V 20/588; G01S 13/931
See application file for complete search history.

(56) References Cited

U.S. PATENT DOCUMENTS 9,020,755 B1 * 4/2015 Gazit .................. G01S 19/41
701/470
11,366,238 B2 * 6/2022 Cvijetic ............... H04W 64/00
(Continued)

FOREIGN PATENT DOCUMENTS

DE 102014002821 A1 8/2015
DE 102015208228 A1 11/2016
(Continued)

*Primary Examiner* — Ramsey Refai
(74) *Attorney, Agent, or Firm* — Seed IP Law Group LLP

(57) ABSTRACT

According to a method for self-localization of a vehicle, a first pose of the vehicle is determined in a map coordinates system, based on environment sensor data representing an environment of the vehicle, a landmark is detected in the environment, a position of the landmark is determined in the map coordinates system and a second pose of the vehicle is determined in the map coordinates system dependent on the position of the landmark. An assignment instruction is consulted, matching up the first pose with at last one preferred sensor type or at least one dominant landmark type. Depending on the assignment instruction, a first environment sensor system is activated and a second environment sensor system is deactivated, whereupon the environment sensor data are generated by means of the first environment sensor system.

10 Claims, 1 Drawing Sheet

(51) Int. Cl.
  *G01S 13/931* (2020.01)
  *G06V 20/56* (2022.01)
  *G06V 20/58* (2022.01)

(52) U.S. Cl.
  CPC ............ *G06V 20/58* (2022.01); *G06V 20/588* (2022.01); *B60W 2420/403* (2013.01); *B60W 2420/408* (2024.01); *B60W 2556/20* (2020.02); *B60W 2556/40* (2020.02)

(56) References Cited

U.S. PATENT DOCUMENTS

| | | | |
|---|---|---|---|
| 2015/0378015 A1* | 12/2015 | You | G01S 13/06 |
| | | | 701/469 |
| 2018/0364366 A1* | 12/2018 | Cvijetic | H04W 4/027 |
| 2020/0200545 A1 | 6/2020 | Wappler et al. | |
| 2022/0306119 A1* | 9/2022 | Weston | B60W 30/12 |

FOREIGN PATENT DOCUMENTS

| | | |
|---|---|---|
| DE | 102016205867 A1 | 10/2017 |
| DE | 102018210765 A1 | 1/2020 |
| WO | 2018033274 A1 | 2/2018 |
| WO | 2020045318 A1 | 3/2020 |

* cited by examiner

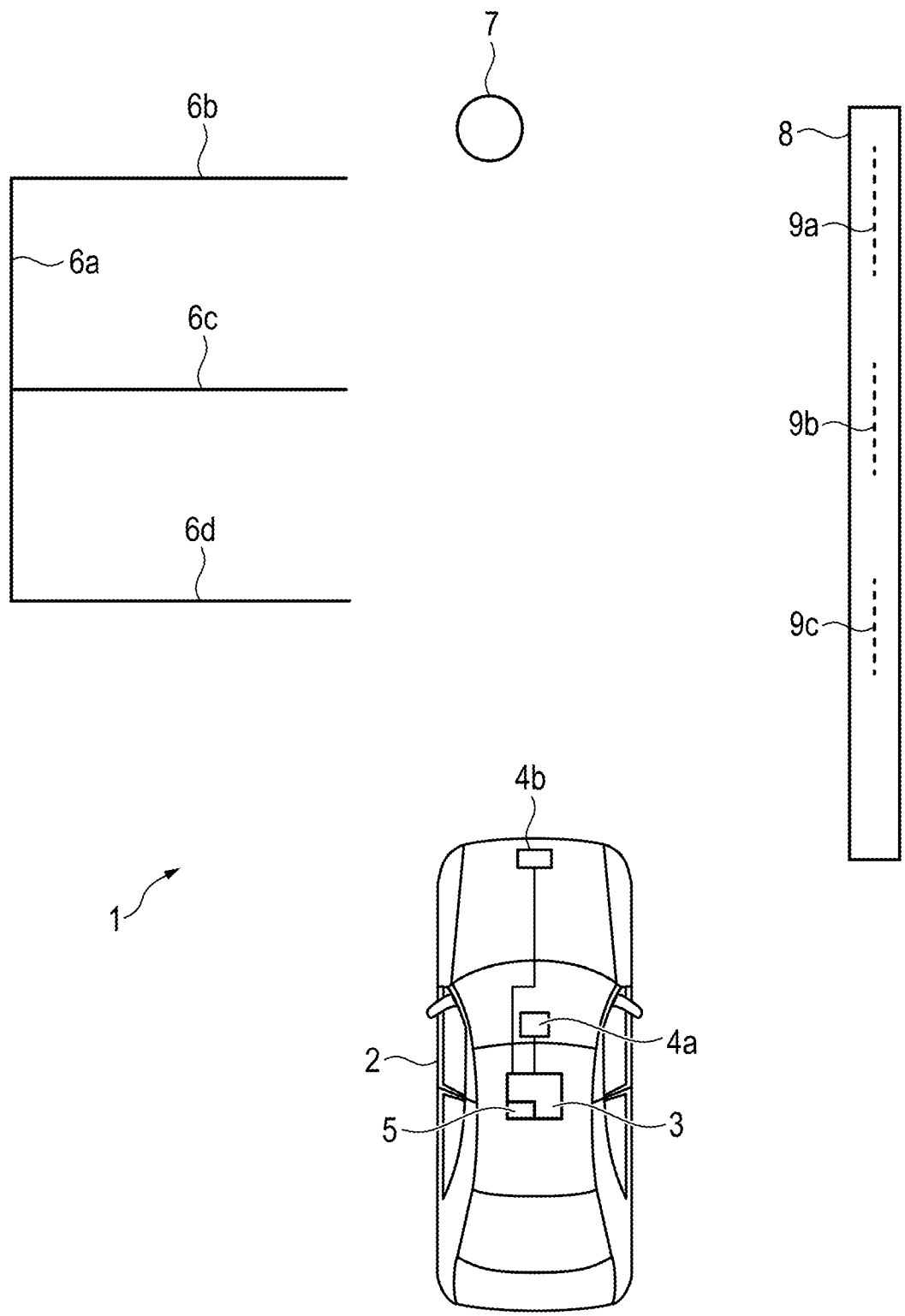

SELF-LOCALIZATION OF A VEHICLE IN A PARKING INFRASTRUCTURE WITH SELECTIVE SENSOR ACTIVATION

BACKGROUND

Technical Field

Embodiments of the invention relate to a method for self-localization of a vehicle in a parking structure or infrastructure, wherein a first pose of the vehicle is determined in a map coordinates system of a digital map stored on a storage medium, based on environment sensor data representing an environment of the vehicle, a landmark is detected in the environment and a position of the landmark is determined in the map coordinates system and a second pose of the vehicle is determined in the map coordinates system dependent on the position of the landmark. Embodiments of the invention furthermore relate to a corresponding sensor device for a vehicle.

Description of the Related Art

Autonomous driving vehicles use suitable sensors and algorithms to determine their position and orientation continuously and can ascertain, by comparison with a digital map, that they are located in a passable area with no static obstacles. For this, a continuous detecting of the environment can be done during the drive with suitable environment sensor systems such as cameras, radar systems and lidar systems. The resulting digital pictures or data can be analyzed with the aid of suitable algorithms in order to recognize meaningful image contents, so-called features or landmarks, such as surfaces, walls, edges, ground marking lines and intersections of ground marking lines, and to determine their position.

The quality of the analysis results may vary with the sensor type given the same boundary conditions, so that in general several types of sensors will be used at the same time. This has the advantage that the vehicle position and orientation can still be calculated in parking infrastructure such as parking buildings in which the view is often impaired, as compared to public roads and highways.

The detection results can be compared by one or more sensor-specific localization algorithms against information of the digital map, describing the landmark type of the landmarks and their positions in the map coordinates system of the digital map, i.e., in particular inside the parking infrastructure. On the basis of the position of the detected landmarks obtained from the digital map, and taking into account the measured distance between the vehicle and the detected landmarks, the vehicle position and orientation are determined in the map coordinates system.

The operation of the environment sensor system and the localization algorithms results in increased energy consumption, which must be provided by the onboard network of the vehicle, as well as a high demand on computing resources.

Document US 2020/0200545 A1 describes a method for the detection of landmarks in which the detection of particular landmark types is confined to a portion of the detected environment data. For example, the vehicle is recognized as being stationary in one region of the image, there is no searching for ground marking lines, and so forth.

BRIEF SUMMARY

Some embodiments reduce the energy consumption during the self-localization of a vehicle with the aid of environment sensor data.

Some embodiments include consulting a previously stored assignment instruction based on a first pose of a vehicle, which matches up the first pose with a sensor type or a landmark type. Based on the match, a first environment sensor system is activated and a second environment sensor system is deactivated. The activated environment sensor system is used to determine a second pose of the vehicle.

In some embodiments, a method is specified for self-localization of a vehicle in a parking infrastructure, wherein a first pose of the vehicle is determined in a map coordinates system of a digital map stored on a storage medium, especially that of the vehicle. An assignment instruction stored on the storage medium is consulted, in particular by means of the at least one computer unit, the assignment instruction matching up the first pose with at least one preferred sensor type or at least one dominant landmark type, especially a dominant landmark type in an environment of the first pose. A first environment sensor system of the vehicle configured according to a first sensor type is activated, especially by means of the at least one computer unit, in dependence on the consulted assignment instruction, i.e., in particular in dependence on the matching up of the first pose with the at least one preferred sensor type or the at least one dominant landmark type. A second environment sensor system of the vehicle configured according to a second sensor type is deactivated, especially by means of the at least one computer unit, in dependence on the assignment instruction, in particular in dependence on the matching up, wherein the second sensor type is in particular different from the first sensor type. By means of the activated first environment sensor system, environment sensor data are generated, representing an environment of the vehicle. A landmark in the environment of the vehicle is detected, especially by means of the at least one computer unit, based on the environment sensor data, and a position of the landmark is determined in the map coordinates system. A second pose of the vehicle is determined in the map coordinates system, especially by means of the at least one computer unit, in dependence on the position of the landmark and optionally in dependence on the first pose. The vehicle is configured in particular as a motor vehicle, such as an automobile.

Self-localization can be understood to mean, in particular, that the vehicle itself, especially the at least one computer unit, determines the second pose. The first pose may likewise be determined previously by the vehicle, especially the at least one computer unit. The determination of the first pose may be done in familiar manner, i.e., for example by using the first and/or second environment sensor system and/or another environment sensor system of the vehicle. The first pose can also be determined on the basis of geo-coordinates determined by means of a receiver for signals of a global navigation satellite system (GNSS), such as GPS, GLONASS, Galileo and/or Beidou. Alternatively, the first pose can also be provided in another way and provided to the at least one computer unit.

A pose here and in the following involves a position and can also involve an orientation, especially in the case of a pose of the vehicle, both of these in particular in the map coordinates system, unless otherwise stated. The first pose of the vehicle involves in particular a first position and a first orientation of the vehicle in the map coordinates system. The second pose of the vehicle involves in particular a second position and a second orientation of the vehicle in the map coordinates system. The vehicle has the first pose at a first time and the second pose at a second time, coming after the first time.

The parking infrastructure can be for example a parking structure, a parking place or some other parking area. The parking infrastructure has multiple parking places in which vehicles, especially motor vehicles, such as automobiles, can be parked. For example, it may be a parking infrastructure for valet parking, in which case the vehicle is brought by a human driver or user up to an entry zone of the parking infrastructure. The driver or user can then leave the vehicle and the vehicle can then be parked autonomously.

The method is thus a method for self-localization of a fully autonomously drivable vehicle, also known as a self-driving vehicle. In other embodiments, however, the vehicle is not necessarily configured for fully autonomous driving. For example, the self-localization can then be used for partially autonomous driving functions or for driver assistance.

A landmark can be understood to be features and/or patterns in an environment, which can be identified and matched up with at least certain place information or position information. These may be, for example, characteristic points or objects which are situated at particular positions in the environment.

A landmark can be assigned to a landmark type, especially on the basis of one or more geometrical and/or semantic attributes of the landmark. Thus, for example, road markings, lane markings, other ground marking lines, the edges or corners of buildings, masts, posts, traffic, information, or other signs, buildings, elements of vegetation, buildings or portions thereof, portions of traffic control systems, two-dimensional codes such as QR codes or barcodes, alphanumerical expressions and so forth are each defined as landmark types. A landmark can also be assigned to multiple landmark types.

The matching up of the first pose with the at least one preferred sensor type or the at least one dominant landmark type can be understood to be a matching up of the environment of the vehicle, when it is located at the first position of the first pose, with the at least one preferred sensor type or the at least one dominant sensor type.

The at least one preferred sensor type comprises in particular the first sensor type and not the second sensor type. The at least one sensor type corresponds to one or more sensor types which are especially well suited according to experience, such as has been determined during previous analysis drives, for the self-localization in the corresponding environment area of the first pose or first position. Which particular sensor type is involved can be determined in advance, for example by detecting and classifying the landmark and various other landmarks in the parking infrastructure, so that each time a corresponding landmark type and an associated preferred sensor type can be matched up with them. In particular, each landmark type is matched up with at least one sensor type. In this way, the at least one computer unit, when the assignment instruction consulted from the storage medium matches up the first pose with the at least one dominant landmark type, can deduce the corresponding preferred sensor type or at least one corresponding preferred sensor type.

The assignment instruction can be stored for example as part of the digital map, in particular as an additional map layer. Thus, for example, a corresponding match can be found for any given position or pose in the entire region of the parking infrastructure.

The activating of the first environment sensor system can be understood to mean also a leaving of the first environment sensor system activated, if the first environment sensor system is already activated at the corresponding time. Similarly, the deactivating of the second environment sensor system can also mean leaving the second environment sensor system deactivated, if the second environment sensor system is already deactivated at the corresponding time.

An environment sensor system can also generally mean a sensor system which is capable of generating environment sensor data or sensor signals, depicting, representing, or otherwise reproducing the environment of the vehicle or the environment sensor system. For example, cameras, radar systems, lidar systems or ultrasound sensor systems can be understood to be environment sensor systems.

A sensor type can accordingly mean the specific configuration of the particular environment sensor system as a camera, radar system, lidar system or ultrasound sensor system. Depending on the embodiment of the method, an even more detailed differentiation can be done for different sensor types, such as different cameras, like cameras working in the visible range or the infrared range, and so forth, different radar systems, which are particularly sensitive for example in the near range or in the far range, different lidar systems, such as laser scanner or flash lidar systems, and so forth. In other embodiments, a more coarse division among different sensor types can also be considered, for example according to the physical phenomena detected. Thus, for example, optical sensor systems can be distinguished from sensor systems which are sensitive to radio waves or those which are sensitive to ultrasound waves, and so forth. A combination of different categorizations is also possible.

The deactivating of the second environment sensor system involves in particular the deactivating of a voltage supply or power supply for the operation of the second environment sensor system. The deactivating can also involve the deactivating of other peripheral units of the second environment sensor system, such as amplifier units for signal amplification, filter units for signal filtering and so forth. Similarly, the activating of the first environment sensor system involves in particular the activating of a voltage supply or power supply for the operation of the first environment sensor system. The activating can also involve the activating of other peripheral units of the first environment sensor system, such as amplifier units for signal amplification, filter units for signal filtering and so forth.

The activation of the first environment sensor system and/or the deactivation of the second environment sensor system need not occur abruptly or at the same time. Instead, it is possible to provide a fading out, so that in a transitional period of time both environment sensor systems, i.e., the first and the second environment sensor system, are activated and used for the self-localization. Neither is it necessarily required for the activation of the first environment sensor system and/or the deactivation of the second environment sensor system or the fading out to occur immediately after consulting the assignment instruction. For example, the assignment instruction can also be consulted proactively at an earlier time, so that the vehicle computer unit has more time available for planning the activation, deactivation, or fading out.

Finally, the assignment instruction is also not necessarily the only condition and/or the only basis for activating the first environment sensor system or deactivating the second environment sensor system. In particular, further boundary conditions can go into the decision making, such as a current speed of the vehicle or an accuracy or minimum accuracy needed for the self-localization.

Thus, thanks to the use of the matching up of the at least one preferred sensor type, directly through the matching up of the first pose with the at least one preferred sensor type using the assignment instruction or indirectly through the matching up of the first pose with the at least one dominant landmark type, it is possible to activate only those environment sensor systems, especially during the self-localization, which can offer with high probability a relatively large benefit for the self-localization, because corresponding landmarks or features are present in the corresponding environment of the first pose. By contrast with the continuous parallel operation of all sensors installed in the vehicle and used for the self-localization, including their peripherals, such as the voltage supply, amplification, filtering, and so forth, the selective activation and deactivation of the first and second environment sensor systems can reduce the onboard network power consumption. In addition, the overall service life of the environment sensor systems, especially that of the second environment sensor system, can be increased, since this will not be activated when it is not used for the self-localization.

According to at least one embodiment of the method, in dependence on the assignment instruction an optical sensor system of the first environment sensor system is activated and a radar system of the second environment sensor system is deactivated. In other words, the first environment sensor system comprises an optical sensor system or consists of the optical sensor system and the second environment sensor system comprises a radar system or consists of the radar system.

An optical sensor system can mean a sensor system based on the detection of light, where light here may involve both visible light as well as electromagnetic waves in the infrared or ultraviolet spectrum. In other words, an optical sensor system comprises at least one optical detector. Cameras or lidar systems in particular constitute optical sensor systems.

Such embodiments are particularly advantageous when corresponding visible landmarks or those which are detectable with infrared light are present in the environment of the first pose, which can be used for the self-localization and in particular for the determination of the second pose, yet which cannot be detected with the use of radar systems, or not with adequate reliability. For example, this generally applies to road markings, parking place markings or other marking lines, or intersections of road marking lines, and so forth. Moreover, this also applies to landmarks whose semantic content is required for the definition or the distinct identification of the landmark. For example, the meaning of a traffic sign or an information sign or a warning sign and so forth can be determined with the aid of a camera or some other optical sensor system, possibly with a follow-up segmentation or detection algorithm, whereas this is hardly possible, or not possible, with a radar system.

Thus, in such embodiments, the radar system is deactivated, since it offers no major advantage for the self-localization.

According to at least one embodiment in which the optical sensor system of the first environment sensor system is activated and the radar system of the second environment sensor system is deactivated, the landmark contains at least one ground marking line or at least one intersection of the at least one ground marking line. In other words, the at least one ground marking line or the at least one intersection of the at least one ground marking line is detected as the landmark.

According to at least one embodiment, a radar system of the first environment sensor system is activated and an optical sensor system of the second environment sensor system is deactivated in dependence on the assignment instruction.

Such embodiments are especially suitable when landmarks are mainly present in the environment of the first pose such as cannot be detected by means of an optical sensor system, or not reliably detected, but which can be detected by a radar system. For example, metallic structures which might be entirely or partly concealed by other objects can be reliably recognized by radar systems, whereas such is not the case with optical sensor systems. Such metallic structures might for example be integrated in or on walls or other building parts.

According to at least one embodiment in which the radar system of the first environment sensor system is activated and the optical sensor system of the second environment sensor system is deactivated, the landmark contains at least one metallic structure or a building wall or a portion of the building wall. In other words, the at least one metallic structure or the building wall or the portion of the building wall is detected as the landmark.

According to at least one embodiment, a current speed of the vehicle is determined, for example, by means of a velocity sensor of the vehicle. The first environment sensor system is activated in dependence on the current speed and/or the second environment sensor system is deactivated in dependence on the current speed.

Thanks to the additional consideration given to the current speed, one can deal with the circumstance that certain sensor systems or the environment sensor data generated with them are especially reliable when the vehicle is at standstill or moving at low speed, but might not be so at greater speed. Thus, this can further enhance the reliability of the self-localization.

According to at least one embodiment, the first environment sensor system is activated in dependence on a given localization accuracy and/or the second environment sensor system is deactivated in dependence on the given localization accuracy, The localization accuracy can be, for example, a nominal accuracy for the localization or for the determination of the second pose or a predetermined minimum accuracy for the localization of the second pose.

In such embodiments, it is possible to avoid environment sensor systems, especially the second environment sensor system, being deactivated because it might only make a small contribution to the self-localization, even though it may still lead to a higher overall accuracy of the localization. These embodiments thus make possible a balancing between the energy consumption and the localization accuracy.

According to at least one embodiment, an analysis drive is carried out in the parking infrastructure by means of the vehicle in order to determine the assignment instruction, wherein the first environment sensor system is activated and the second environment sensor system is activated during the analysis drive.

The analysis drive takes place in particular before the determination of the first and the second pose. During the analysis drive, the vehicle can thus determine the nature and location of the landmark and possibly other landmarks present in the parking infrastructure and thus create or update the assignment instruction. In other words, the additional map layer with the assignment instruction is created in this way. The analysis drive need not necessarily be a drive carried out solely for the purpose of determining the assignment instruction, but rather it may involve a normal usage of the vehicle in the parking infrastructure. Thus, the analysis drive, or possibly several analysis drives, can supplement the map layer having the assignment instruction with further assignment instructions and be built out step by step so that the embodiments described herein can be used in an ever increasing extent.

The analysis drive can be carried out additionally or alternatively in the parking infrastructure with a further vehicle. In particular, during the analysis drive, there is activated both a further first environment sensor system of the further vehicle configured according to the first sensor type and a further second environment sensor system of the further vehicle configured according to the second sensor type.

According to at least one embodiment, further first environment sensor data are generated during the analysis drive of the vehicle by means of the first environment sensor system and further second environment sensor data are generated by means of the second environment sensor system. The assignment instruction is determined based on the further first environment sensor data and the further second environment sensor data in particular by means of the at least one computer unit.

In alternative embodiments, alternatively or additionally, the further first environment sensor data are generated during the analysis drive of the further vehicle by means of the further first environment sensor system and the further second environment sensor data are generated during the analysis drive of the further vehicle by means of the second further environment sensor system. The assignment instruction is determined based on the further first environment sensor data and the further second environment sensor data, for example by means of at least one further computer unit of the further vehicle.

The further first and second environment sensor data correspond to a detection region or visual field in which the landmark is situated.

Instead of determining the assignment instruction by means of the at least one computer unit or the at least one further computer unit, this can be determined based on the first and second further environment sensor data also by a vehicle-external computer unit, such as a cloud computer unit or a cloud server and saved in memory, and relayed in particular to the vehicle.

In some embodiments, a sensor device for a vehicle is specified, especially a motor vehicle, such as a self-driving vehicle. The sensor device comprises a first environment sensor system configured according to a first sensor type, a second environment sensor system configured according to a second sensor type, a storage medium which stores a digital map, and a control system. The control system is adapted to determine a first pose of the vehicle in a map coordinates system of the digital map. The control system is adapted to detect a landmark in the environment based on environment sensor data representing an environment of the vehicle, and to determine a position of the landmark in the map coordinates system. The control system is adapted to determine a second pose of the vehicle in the map coordinates system dependent on the position of the landmark. The control system is adapted to consult an assignment instruction stored on the storage medium, matching up the first pose with at last one preferred sensor type or at least one dominant landmark type. The control system is adapted to activate the first environment sensor system in dependence on the assignment instruction and to deactivate the second environment sensor system in dependence on the assignment instruction. The first environment sensor system is adapted to generate the environment sensor data when it is or has been activated.

The control system can comprise one or more computer units. In particular, the control system can comprise the at least one computer unit of the vehicle, which has already been described with regard to the various embodiments of the methods described herein, or vice versa.

Further embodiments of the sensor device will emerge from the different embodiments of the methods described herein and vice versa. In particular, a sensor device can be adapted to carry out a method as described herein, or it carries out such a method.

In some embodiments, an electronic vehicle guidance system for a vehicle is specified, comprising a sensor device as described herein.

An electronic vehicle guidance system can be understood to be an electronic system which is adapted to guide a vehicle fully automatically or fully autonomously, especially without needing the intervention of a driver in the control. The vehicle performs automatically all required functions, such as steering, braking and/or acceleration maneuvers, the observation and detecting of highway traffic, and appropriate responses. In particular, the electronic vehicle guidance system can implement a fully automatic or fully autonomous driving mode of the motor vehicle according to level 5 of the classification of SAE J3016. An electronic vehicle guidance system can also mean an "advanced driver assistance system" (ADAS), which supports the driver during partly automated or partly autonomous driving. In particular, the electronic vehicle guidance system can implement a partly automatic or partly autonomous driving mode according to levels 1 to 4 of the classification of SAE J3016. Here and in the following, "SAE J3016" refers to the corresponding standard in the version of June 2018.

The at least partly automatic vehicle guidance can therefore involve a guidance of the vehicle according to a fully automatic or fully autonomous driving mode of level 5 of SAE J3016. The at least partly automatic vehicle guidance can also involve a guidance of the vehicle according to a partly automatic or partly autonomous driving mode according to levels 1 to 4 of SAE J3016.

A computer unit can be understood to be in particular a data processing device; in particular, the computer unit can thus process data to carry out computational operations. These may also include operations to carry out indexed access to a data structure, such as a "look-up table" (LUT).

The computer unit can contain in particular one or more computers, one or more microcomputers and/or one or more integrated circuits, such as one or more ASIC (application-specific integrated circuits), one or more field-programmable gate arrays (FPGA), and/or one or more SoC (systems on a chip). The computer unit can also contain one or more processors, such as one or more microprocessors, one or more processor units (CPU or central processing unit), one or more GPU (graphics processing unit) and/or one or more signal processors, especially one or more digital signal processors (DSP). The computer unit can also contain a physical or a virtual grouping of computers or other of the mentioned units.

In various embodiments, the computer unit comprises one or more hardware and/or software interfaces and/or one or more storage units. Some embodiments include a motor vehicle having a sensor device as described herein and/or an electronic vehicle guidance system as described herein.

Some embodiments also encompass combinations of features of the described embodiments.

BRIEF DESCRIPTION OF THE SEVERAL VIEWS OF THE DRAWINGS

The FIGURE shows a schematic representation of an embodiment of a sensor device.

DETAILED DESCRIPTION

The embodiments explained in the following are examples of embodiments of the invention. In the described embodiments, the components described each represent individual features to be viewed independently of each other, which may also develop additional embodiments further independently of each other and therefore should also be viewed as part of embodiments of the invention individually or in a combination other than the one shown. Furthermore, the embodiments described can also be supplemented with other of the features described herein.

The FIGURE shows schematically a motor vehicle 2, especially a self-driving motor vehicle, having an embodiment of a sensor device 1.

The sensor device 1 contains at least two environment sensor systems 4a, 4b, which are configured according to different sensor types. For example, the first environment sensor system 4a may be an optical sensor system, such as a camera, and the second environment sensor system 4b may be a radar system. However, the sensor device 1 is not limited to the combination of these two sensor types, but instead it can be used for any different sensor types.

The sensor device 1 furthermore comprises a control system 3 with a storage medium 5. The control system 3 may include one or more computer units of the vehicle and can serve for actuating the environment sensor systems 4a, 4b and for evaluating the environment sensor data generated by the environment sensor systems 4a, 4b.

The motor vehicle 2 is located in particular in a parking structure or infrastructure. For example, multiple different landmarks 6a, 6b, 6c, 6d, 7, 8, 9a, 9b, 9c in the parking infrastructure are shown. The landmarks 6a, 6b, 6c, 6d, 7, 8, 9a, 9b, 9c may correspond to different landmark types. For example, the landmarks 6a, 6b, 6c, 6d may involve ground marking lines or the like, such as those bounding off the parking places. The landmark 7 for example can be a post or a traffic sign or the like. The landmark 8 can be a wall or some other part of the building or part of some other structure. The landmarks 9a, 9b, 9c may be, for example, metallic structures integrated in the wall, such as steel girders or the like.

Depending on the landmark type, the different environment sensor systems 4a, 4b may be more or less suited to the detection of the corresponding landmarks 6a, 6b, 6c, 6d, 7, 8, 9a, 9b, 9c and thus to the self-localization of the vehicle 2.

By means of the sensor device 1, for example, a method for self-localization of the vehicle 2 in the parking infrastructure can be carried out. For this, at first a first pose of the vehicle 2 is determined in a map coordinates system of a digital map stored on the storage medium 5. For example, this can be done on the basis of environment sensor data which are generated by means of both environment sensor systems 4a, 4b. The environment sensor data can be compared against the digital map, so that a position and/or orientation of the vehicle 2 can be determined in the map coordinates system. For this, the control system 3 in particular can evaluate the environment sensor data in order to detect one or more of the landmarks 6a, 6b, 6c, 6d, 7, 8, 9a, 9b, 9c. Since the positions of the landmarks 6a, 6b, 6c, 6d, 7, 8, 9a, 9b, 9c are also stored in the digital map, the motor vehicle 2 can be localized accordingly.

The digital map, besides the position information regarding the landmarks 6a, 6b, 6c, 6d, 7, 8, 9a, 9b, 9c, also contains information regarding the respective landmark type of the landmarks 6a, 6b, 6c, 6d, 7, 8, 9a, 9b, 9c. For example, an additional map layer may be present, saving a corresponding assignment instruction for each position in the parking infrastructure, matching up the respective position with a dominant landmark type in the environment around the corresponding position. On the basis of the first pose determined for the vehicle 2, the control system 3 can accordingly consult the assignment instruction from the map and then for example arrange to activate the first environment sensor system 4a in dependence on the assignment instruction, while deactivating the second environment sensor system 4b in dependence on the assignment instruction.

In the example described above, where the first environment sensor system 4a involves a camera and the second environment sensor system 4b involves a radar system, the assignment instruction can for example match up the pose determined for the vehicle 2 with the landmark type of the landmarks 6a, 6b, 6c, 6d, i.e., ground marking lines, for example. Since ground marking lines can be detected with high reliability by means of optical sensor systems such as a camera and be identified by means of corresponding evaluation algorithms, whereas the detection of ground marking lines with the aid of radar data is difficult or impossible, the radar system can be deactivated accordingly, without this leading to a significant loss of localization accuracy. In this way, energy can be saved for the operation of the radar system.

It should be emphasized that the described scenario is only an example and in other situations other decisions can be made for the activation and/or deactivation of corresponding environment sensor systems.

Thus, in particular, it is possible to verify continuously, during the driving of the vehicle 2 through the parking infrastructure and by comparing against the additional map layer, which sensor types in which area of the parking infrastructure should be advantageously activated or left activated and which sensor types can be deactivated.

The particular activated environment sensor system, thus the first environment sensor system 4a in the described example, can then generate further environment sensor data and the control system 3 can determine a further pose of the vehicle 2 on the basis of the further environment sensor data by comparing them against the digital map, as described.

Autonomous driving vehicles must use suitable sensors and algorithms to determine their position and orientation continuously and ascertain, by comparison with a digital map, that they are located in a passable area with no static obstacles. For this, a continuous detecting of the environment is done during the drive with suitable sensors such as cameras, radar and lasers. The resulting digital pictures are analyzed with the aid of suitable algorithms in order to recognize meaningful image contents, so-called features or landmarks, such as wall surfaces, edges, lines and line intersections, and to determine their position.

Since the quality of the analysis results may vary with the sensor type given the same boundary conditions, in general several types of sensors will be used in autonomous driving vehicles. This has the advantage that the vehicle position and orientation can still be calculated at every point and at every time in parking spaces in which the view is often impaired, as compared to public roads and highways. Thus, for example, it is possible in areas with many ground markings to visually detect enough lines and line intersections with the aid of camera systems and perform the calculation of the vehicle position and/or orientation on this basis. In areas with few ground markings, but many metallic structures, on the other hand, the edges and surfaces of these can be detected very well with radar, for example, and be used by the localization algorithm for determining the current vehicle position and/or orientation.

The detection results can be compared by a localization algorithm against information of a digital map which describes the landmark type as well as their positions within the parking space. On the basis of the position of the detected landmarks read out from the digital map, and taking into account the measured distance between the vehicle and the detected landmarks, the vehicle position and orientation within the parking space are determined.

In some embodiments, not all the data of the installed sensor systems are used and taken into account for the determination of the vehicle position and orientation, and the sensor systems not used or required, including their peripherals, such as those for the voltage supply, amplification, or filtering, can be deactivated.

Thus, it is possible to avoid a needlessly large onboard network power consumption due to the continuous parallel operation of all sensors installed in the vehicle and used for the vehicle self-localization. Furthermore, it is possible to avoid an unnecessary reduction of the remaining service life of the sensors due to the continuous parallel operation of all sensors installed in the vehicle and used for the vehicle self-localization.

In different variants, a digital map implemented in the vehicle is used during the drive through a parking infrastructure which shows, in addition to the type and the position of the landmarks, the areas within the parking infrastructure and optionally the viewing angles for certain sensor types to make possible a detecting of the respective landmarks. By reading out this information from the map, and in dependence on the current vehicle position and orientation, it is possible to actively switch on only the sensor systems which have a possibility of detecting the features and landmarks in the direct and indirect environment of the vehicle. Thus, for example, a rear camera and its peripherals can be deactivated when there are no visual landmarks in a particular area behind the vehicle. In another scenario, the right corner radars can be deactivated, for example, when there are enough radar landmarks on the left side of the vehicle for the required accuracy of the vehicle self-localization.

Some embodiments involve an automatic generating of the digital map or a supplementing of the digital map with the additional information on relevant landmark types or sensor types, for example on a cloud basis.

For this, during the driving of vehicles of a given fleet of vehicles through the parking infrastructure at first a detection is done for the existing features and landmarks and then a determination is made of the particular landmark type and the particular landmark position. Then, for example after leaving the parking infrastructure, an analysis can be done as to which landmark types occur more frequently in which areas of the parking infrastructure or represent the predominant portion of them.

As a further aspect, it is proposed to make an analysis, after leaving the parking infrastructure, of the places where an activation and deactivation of the respective environment sensor systems can be done for negligible gaps in the calculation of the vehicle position and orientation during the later use of the automatically generated expanded digital map for the self-localization. Also in order to make possible a soft fading in and out of the particular environment sensor systems instead of a hard switching on and off, after leaving the parking infrastructure an analysis can be done as to the positions where a fading out should be commenced and ended so that any gaps will be few in the calculation of the vehicle position and orientation during the later use.

Thus, for example, a cloud-based generating of an additional meta-data layer in a digital parking structure map can be produced with additional information. The additional information may involve the dominant landmark types within certain areas and information on the boundaries of the areas, favorable activation points for the environment sensor systems in an upcoming area, favorable deactivation points for the environment sensor systems in an area lying to the rear, and/or the beginning and end of favorable fading out areas for the environment sensor systems.

For example, it is possible to realize vehicles driving autonomously through parking structures which activate only the radar system and/or the algorithm for detection of radar landmarks in areas with dominant radar landmarks and which activate only the optical sensor systems and/or algorithms for the detection of visual landmarks in areas with a lot of visual landmarks. Thus, the required computing power, costs, and/or energy can be reduced.

German patent application no. 10 2021 117742.1, filed Jul. 9, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for self-localization of a vehicle in a parking structure, comprising:
   determining a first pose of the vehicle in a map coordinates system of a digital map stored on a storage medium,
   based on environment sensor data representing an environment of the vehicle, detecting a landmark in the environment and determining a position of the landmark in the map coordinates system; and
   determining a second pose of the vehicle in the map coordinates system dependent on the position of the landmark;
   wherein
   an assignment instruction stored on the storage medium is consulted, matching up the first pose with at least one preferred sensor type or at least one dominant landmark type;
   a first environment sensor system of the vehicle, configured according to a first sensor type, is activated in dependence on the assignment instruction;
   a second environment sensor system of the vehicle, configured according to a second sensor type, is deactivated in dependence on the assignment instruction; and
   the environment sensor data are generated by means of the first environment sensor system.

2. The method according to claim 1, wherein, in dependence on the assignment instruction, an optical sensor system of the first environment sensor system is activated and a radar system of the second environment sensor system is deactivated.

3. The method according to claim 2, wherein at least one ground marking line or at least one intersection of the at least one ground marking line is detected as the landmark.

4. The method according to claim 1, wherein, in dependence on the assignment instruction, a radar system of the first environment sensor system is activated and an optical sensor system of the second environment sensor system is deactivated.

5. The method according to claim 4, wherein:
at least one metallic structure is detected as the landmark; or
a building wall or a portion of the building wall is detected as the landmark.

6. The method according to claim 1, wherein:
a current speed of the vehicle is determined;
the first environment sensor system is activated in dependence on the current speed; and/or
the second environment sensor system is deactivated in dependence on the current speed.

7. The method according to claim 1, wherein:
the first environment sensor system is activated in dependence on a given localization accuracy; and/or
the second environment sensor system is deactivated in dependence on the given localization accuracy.

8. The method according to claim 1, wherein:
an analysis drive is carried out in the parking structure by means of the vehicle in order to determine the assignment instruction, wherein the first environment sensor system is activated and the second environment sensor system is activated during the analysis drive; or
an analysis drive is carried out in the parking structure by means of a further vehicle in order to determine the assignment instruction, wherein a further first environment sensor system of the further vehicle configured according to the first sensor type is activated and a further second environment sensor system of the further vehicle configured according to the second sensor type is activated during the analysis drive.

9. The method according to claim 8, wherein:
further first environment sensor data are generated during the analysis drive by means of the first environment sensor system or by means of the further first environment sensor system; and
further second environment sensor data are generated during the analysis drive by means of the second environment sensor system or by means of the further second environment sensor system; and
the assignment instruction is determined based on the further first environment sensor data and the further second environment sensor data.

10. A sensor device for a vehicle, the sensor device comprising a first environment sensor system configured according to a first sensor type, a second environment sensor system configured according to a second sensor type, a storage medium which stores a digital map, and a control system which is adapted to:
determine a first pose of the vehicle in a map coordinates system of the digital map;
based on environment sensor data representing an environment of the vehicle, detect a landmark in the environment and determine a position of the landmark in the map coordinates system; and
determine a second pose of the vehicle in the map coordinates system dependent on the position of the landmark,
wherein:
the control system is adapted to consult an assignment instruction stored on the storage medium, matching up the first pose with at last one preferred sensor type or at least one dominant landmark type;
the control system is adapted to activate the first environment sensor system in dependence on the assignment instruction and/or the second environment sensor system in dependence on the assignment instruction; and
the first environment sensor system is configured to generate the environment sensor data.

* * * * *